US010731997B2

(12) United States Patent
Dong et al.

(10) Patent No.: US 10,731,997 B2
(45) Date of Patent: *Aug. 4, 2020

(54) SYSTEM, METHOD AND COMPUTER PROGRAM PRODUCT FOR CONSOLIDATION OF REQUESTS FOR ACCESS TO DYNAMIC MAP

(71) Applicant: International Business Machines Corporation, Armonk, NY (US)

(72) Inventors: Wei Shan Dong, Beijing (CN); Peng Gao, Beijing (CN); Chang Sheng Li, Beijing (CN); Chun Yang Ma, Beijing (CN); Ren Jie Yao, Beijing (CN); Xin Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 57 days.

This patent is subject to a terminal disclaimer.

(21) Appl. No.: 15/994,699

(22) Filed: May 31, 2018

(65) Prior Publication Data
US 2018/0274933 A1 Sep. 27, 2018

Related U.S. Application Data

(63) Continuation of application No. 15/248,920, filed on Aug. 26, 2016, now Pat. No. 10,060,750.

(51) Int. Cl.
G01C 21/32 (2006.01)
G06F 16/29 (2019.01)
G06F 16/28 (2019.01)

(52) U.S. Cl.
CPC .......... *G01C 21/32* (2013.01); *G06F 16/287* (2019.01); *G06F 16/29* (2019.01)

(58) Field of Classification Search
CPC ........ G01C 21/32; G06F 16/287; G06F 16/29
USPC ........................................................ 701/532
See application file for complete search history.

(56) References Cited

U.S. PATENT DOCUMENTS

2015/0153187 A1 6/2015 Dong et al.
2016/0258777 A1* 9/2016 Bodake ................ G01C 21/367

OTHER PUBLICATIONS

United States Notice of Allowance dated Apr. 23, 2018 in U.S. Appl. No. 15/248,920.
United States Office Action dated Jan. 16, 2018 in U.S. Appl. No. 15/248,920.
United States Office Action dated Nov. 13, 2017 in U.S. Appl. No. 15/248,920.
Mel, et al. "The NIST Definition of Cloud Computing". Recommendations of the National Institute of Standards and Technology, Nov. 16, 2015.

* cited by examiner

*Primary Examiner* — Gertrude Arthur Jeanglaude
(74) *Attorney, Agent, or Firm* — Joseph Petrokaitis, Esq.; McGinn IP Law Group, PLLC

(57) ABSTRACT

A method, system, and computer program product, include receiving a plurality of requests for dynamic context information from a plurality of road segments, determining whether the plurality of road segments are included in a same cluster of road segments in a road network generated by clustering road segments in the road network based on connectivity of the road network; and consolidating the plurality of requests to generate a consolidated request in response to determining that the plurality of road segments are included in the same cluster.

17 Claims, 7 Drawing Sheets

SYSTEM, METHOD AND COMPUTER PROGRAM PRODUCT FOR CONSOLIDATION OF REQUESTS FOR ACCESS TO DYNAMIC MAP

CROSS-REFERENCE TO RELATED APPLICATIONS

The present application is a Continuation Application of U.S. patent application Ser. No. 15/248,920, filed on Aug. 26, 2016, the entire contents of which are hereby incorporated by reference.

BACKGROUND

The present invention relates generally to a request consolidation method, and more particularly, but not by way of limitation, to a system, method, and computer product for a consolidation of concurrent requests for access to dynamic map according to a clustering of road segments.

More and more vehicles are packaged with various sensors, which may be taken advantage of to build a dynamic map incorporating real-time context information of the road network. Drivers may query the dynamic map by sending continuous requests to the server hosting the dynamic map to improve the driving experience. In addition, autopilot has been developing rapidly and thus may rely heavily on real-time context information. Continuous requests for access to the dynamic map may be processed in real-time, thereby resulting in massive real-time accesses.

Conventionally, large amount of access requests may be processed by increasing the hardware performance of the system. For example, more servers with higher performance may be deployed, which may not be economically efficient. Even with the most advanced hardware, it would still be difficult to process the ever-increasing demand of such accesses.

However, needs in the art include the needs to manage requests of users to reduce hardware requirements.

SUMMARY

In an exemplary embodiment, the present invention can provide a computer-implemented method including receiving a plurality of requests for dynamic context information from a plurality of road segments, determining whether the plurality of road segments are included in a same cluster of road segments in a road network generated by clustering road segments in the road network based on connectivity of the road network, and consolidating the plurality of requests to generate a consolidated request in response to determining that the plurality of road segments are included in the same cluster.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
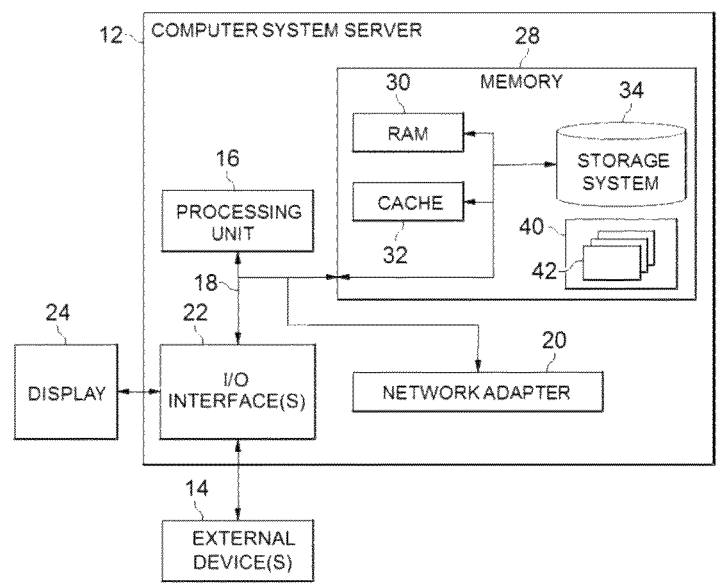
FIG. 1 depicts a cloud computing node 10 according to an embodiment of the present invention.

The invention will now be described with reference to FIG. 1-8, in which like reference numerals refer to like parts throughout. It is emphasized that, according to common practice, the various features of the drawing are not necessarily to scale. On the contrary, the dimensions of the various features can be arbitrarily expanded or reduced for clarity.

Figure 3:
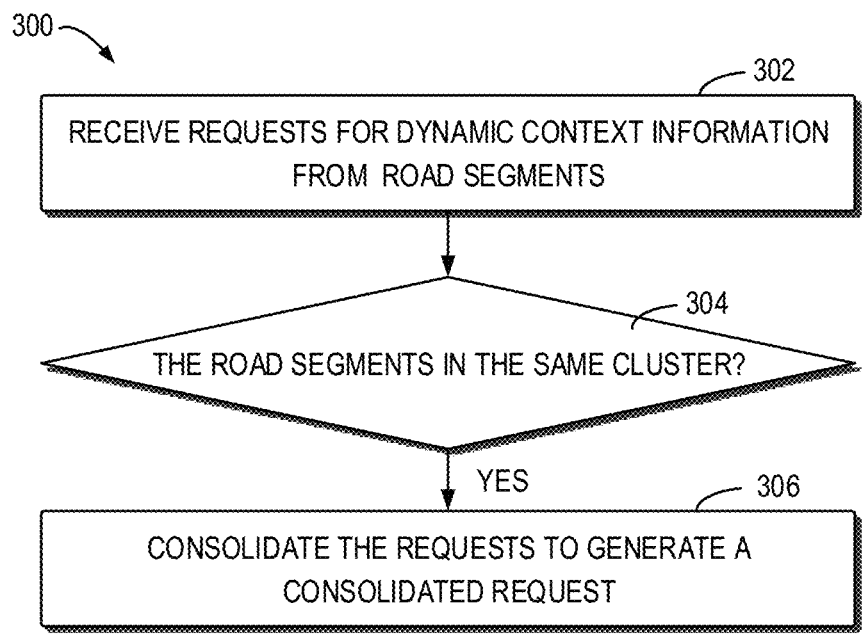
FIG. 3 depicts a flow diagram for a computer-implemented method 300 according to an embodiment of the present invention.

With reference now to the example depicted in FIG. 3, the method 100 includes various steps for consolidating requests for access to a dynamic map. As shown in at least FIG. 1, one or more computers of a computer system 12 according to an embodiment of the present invention can include a memory 28 having instructions stored in a storage system to perform the steps of FIG. 3.

Although one or more embodiments (see e.g., FIGS. 1 and 7-8) may be implemented in a cloud environment 50 (see e.g., FIG. 7), it is nonetheless understood that the present invention can be implemented outside of the cloud environment.

Figure 2:
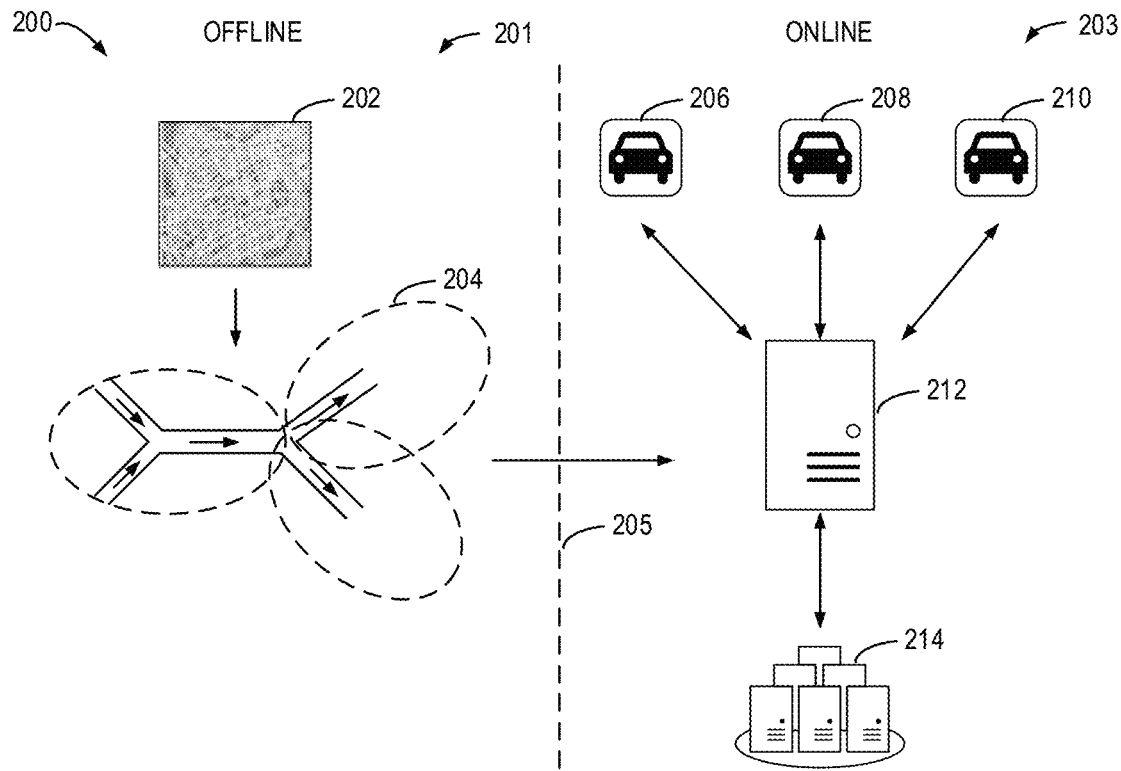
FIG. 2 depicts an overall system environment according to an embodiment of the present invention.

FIG. 2 shows a schematic diagram 200 in which illustrates the principles of embodiments of the present disclosure. It is to be understood that the diagram 200 is described only for the purpose of illustration without suggesting any limitations as to the scope of the present disclosure. The present disclosure can be embodied within any other suitable environments.

As shown in FIG. 2, the processing according to embodiments of the present disclosure includes an offline portion 201 and an online portion 203, which are separated by a dashed line 205. In the offline portion 201, a road network 202 containing multiple road segments are provided as input to a clustering method 204. As used herein, the term "road network" refers to a digital map that at least includes information on one or more roads and/or segments thereof. The clustering method 204 divides the road network 202 into a number of clusters of road segments, for example, based on connectivity of the road network 202. As used herein, the term "connectivity" may indicate connection relations of two neighboring road segments in the road network 202 and may further indicate the desired directions of the two road segments. For example, a two-way road may be considered as two separate roads, because a vehicle generally is not permitted to go in a direction violating traffic regulations. The clustering method 204 may provide the clusters of road segments as output to the online portion 203 in order to facilitate the processing of concurrent dynamic map accesses.

In some embodiments, the offline processing 201 may be implemented on the server 212, for example. Alternatively, the offline portion 201 may be implemented on other servers in communication with the server 212. The delineation of FIG. 2 is made merely for illustrative purpose, without suggesting any limitation as to the scope of the present disclosure.

In the online portion 203, one or more vehicles 206, 208, and 210 that may send concurrent requests for access to a dynamic map are shown. The vehicles 206, 208, and 210 are shown as cars, but can be any type of conveyance travelling on roads. In response to the requests from the vehicles 206, 208, and 210, the server 212 may consolidate the requests by way of communication to the clustering method 204 to generate a consolidated request. The consolidated request is then transmitted to a server cluster 214 that hosts a dynamic map of the road network 202. The dynamic map may contain various aspects of context information associated with the road network 202, for example, terrain/slope, flooding/slippery, parking space availability, speed limit alert/speed control, and/or traffic light control, etc. The dynamic map may be generated using any known method or devices, such as sensors equipped within various vehicles or monitor devices installed on the roadside by municipal administration. The dynamic map may also be generated by any method or device developed in the future.

In response to the consolidated request, the server cluster 214 may query the dynamic map hosted thereon to generate corresponding context information, which may be then provided to the server 212. In some embodiments, the server 212 may modify the context information by removing irrelevant context information for each request. The modified context information may then be transferred to the corresponding vehicle.

The server 212 and each server in the server cluster 214 may be implemented by computer system/server 12 as discussed with reference to FIG. 1, for example. The number of vehicles as shown is for illustrative purpose only, without suggesting any limitation as to the scope of the present disclosure. In practice, the number of vehicles making concurrent requests for access to dynamic map may be significant. In conventional methods, the concurrent requests from a large amount of vehicles are provided to the server cluster 214 to retrieve context information, thereby resulting in an overload of the server cluster 214. On the contrary, the environment 200 as shown may significantly increase capability of request processing while decreasing the workload of the server cluster 214.

Some example embodiments of the present disclosure will now be discussed hereafter with reference to FIG. 3 to FIG. 6b. FIG. 3 shows a flowchart of a method 300 for consolidating requests for access to a dynamic map in accordance with embodiments of the present disclosure. The method 300 will be described in connection with the environment 200 shown in FIG. 2. For example, in some embodiments, the method 300 may be carried out by the sever 212.

In step 302, the server 212 receives multiple requests for dynamic context information from multiple road segments. The requests may be received from the vehicles 206, 208, and 210 as shown in FIG. 2, and may specify current location of respective vehicles, the road ranges of interest, and/or attributes of road segments in question. For instance, the request from vehicle 206 may indicate the current location of the vehicle 206 when the vehicle 206 is making the request. The current location of the vehicle 206 may be located on a road segment where the vehicle is going. As such, the request further specifies the corresponding road segment. As an alternative, in some embodiments, the request may specify the road segment in a direct manner. The road range of interest may indicate the road distance along the driving directions of the road network. The attributes of road segments may indicate the types of context information, for example, terrain/slope, flooding/slippery, parking space availability, speed limit alert/speed control, and/or traffic light control, or the like.

Figure 4:
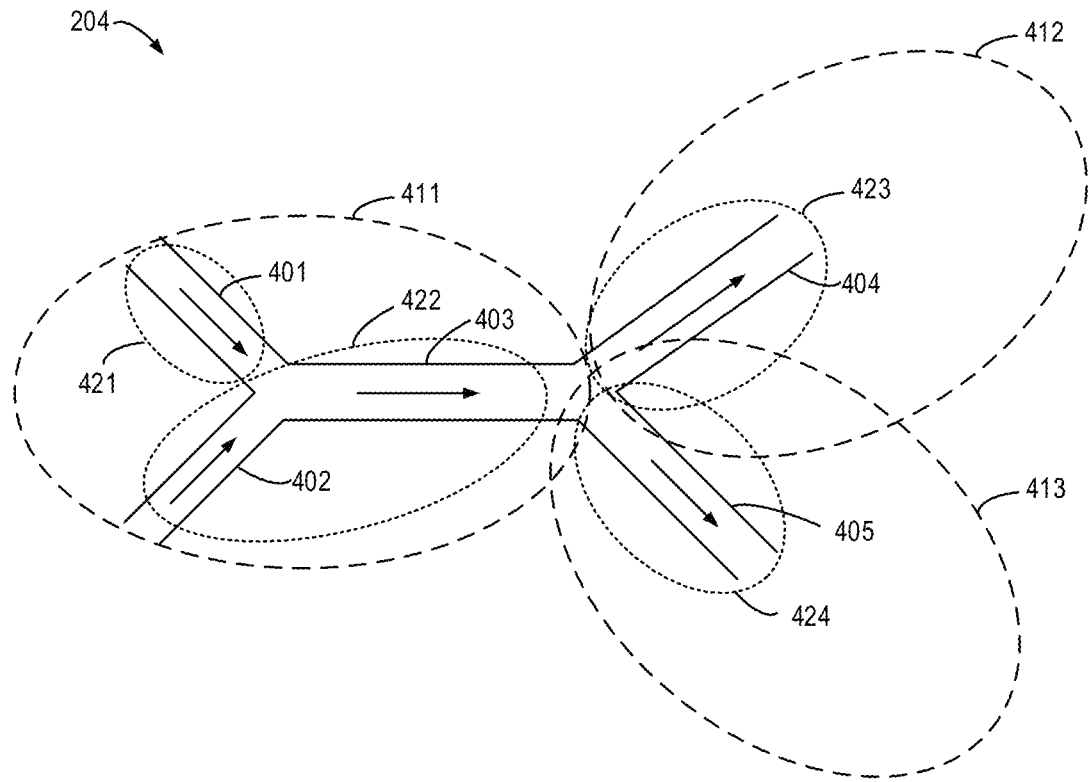
FIG. 4 depicts a schematic diagram illustrating a clustering method 204 for clustering road segments in accordance with an embodiment of the present invention.

In step 304, the server 212 may determine whether the road segments are included in the same cluster of road segments in the road network 202. FIG. 4 shows a clustering method 204 for clustering road segments in the road network 202 in accordance with embodiments of the present disclosure. The clustering method 204 may be implemented in connection with the environment 200 shown in FIG. 2. For example, in some embodiments, the clustering method 204 may be performed offline by the server 212.

As shown in FIG. 4, a portion of the road network 202 is illustrated in an enlarged view and includes five road segments 401, 402, 403, 404, and 405. The arrows depicted inside the road segments may represent the driving directions allowed by traffic regulations, for example. It is to be understood that the road network 202 has been simplified with some parts omitted so as to avoid obscuring the idea of the present disclosure. The simplified topology of the road network is described for the purpose of illustration without suggesting any limitations as to the scope of the present disclosure. It is to be understood that the present disclosure is applicable to other road networks, which may be much more complex in practice.

As described above, the clustering method 204 may divide the road segments (for example road segments 401, 402, 403, 404, and 405) into several clusters based on connectivity of the road network 202, for example, connective distances between road segments in the road network 202. For example, the road network as shown in FIG. 4 may be divided into clusters 411, 412, and 413 depicted by dashed lines. As shown in FIG. 4, the cluster 411 may include the road segments 401, 402, and 403, the cluster 412 may include the road segment 404 and some other road segments not shown, and the cluster 413 may include the road segment 405 and some other road segments not shown.

The clustering method 204 may divide the road segments in a variety of ways. In some embodiments, the clustering method 204 may cluster the road segments based on similarity of road segments in the road network. The similarity of road segments may be evaluated based on connective distances instead of Euclidean distances between road segments. To evaluate the similarity, the road segments in question may also include some other road segments adjacent to the road segments to be clustered. The road distance between two road segments may be measured in terms of the starting, middle or end point of the respective road segments. It is to be understood that the embodiments are described only for the purpose of illustration without suggesting any limitation as to the scope of the present disclosure. For ease of discussion, the road segments to be clustered may be referred to as target road segments.

As known, clustering is a kind of unsupervised machine learning process. In the clustering approach, the individual objects being clustered, for example the target road segments herein, may be represented by feature vectors and thus the similarity of the objects may be measured in terms of the degree of similarity between the corresponding feature vectors, which may also be referred to as the distance between the feature vectors. In order to obtain feature vectors for the target road segments, some or all the road segments within a number of distances $D_1, D_2, \ldots, D_n$, from each target road segment may be determined. As a result, a set of road segments may be obtained for each target road segment. In this way, the target road segment may be represented by the associated set of road segments.

Each set of road segments may include the number of subsets, where each subset may include road segments within the respective distance from the target road segment. For example, for the target road segment 401, the road segment set may be represented as $\{\{S_1, S_2, \ldots, S_m\}, \{S_1', S_2', \ldots, S_m'\}, \ldots\}$, where the subset $\{S_1, S_2, \ldots, S_m\}$ may represent the road segments within the distance $D_1$ from the target road segment 401. In the example shown in FIG. 4, if the distance $D_1$ is determined as being more or less the length of the road segment 402 or 403, the subset $\{S_1, S_2, \ldots, S_m\}$ may include the road segments 402 and 403, as well as some other road segments (not shown) with in the distance $D_1$ on the upstream of the road segment 401. Specifically, as used herein the term "distance" may refer to not only the spatial distance between two segments but also a road distance along the driving direction, thereby indicating the directed connectivity of the road network.

As described above, the similarity of two target road segments may be measured in terms of similarity of associated two sets of road segments, which may be for example referred to as feature vectors of the two target road segments. For example, a first target road segment may be associated with a first set of road segments $C_1$, which may be determined as described above, while a second road segment may be associated with a second set of road segments $C_2$. The relationship of the two target road segments may be determined based on the similarity of the two sets of road segments $C_1$ and $C_2$, which may further include their respective subsets of road segments. The similarity of the two sets $C_1$ and $C_2$ may be, for example, cosine similarity, which is well known in the clustering method. It is to be understood that any other appropriate measure of similarity may be employed.

It would be beneficial to have a number of different distances and associated subsets. For example, the requests for access to dynamic map may be diversified and specify a large amount of different query ranges or distances. If only one distance is considered in the feature vector, the clusters may not be readily applicable to those requests specifying another different distance, thereby compromising the accuracy of the consolidation system.

Of course, in an alternative embodiment, it is possible to process based on a single distance. That is, the number of the distances may be equal to one. Under this circumstance, only road segments within a single distance from the target road segment may be determined as feature vectors and taken into account to evaluate the relationship of target road segments. In this way, clustering method 204 may be substantially simplified at the cost of losing some sort of performance of the consolidation system.

Further, the clustering method 204 may divide the road segments 401, 402, 403, 404, and 405 into multiple clusters at two or more different levels. For example, FIG. 4 shows several low level clusters 421, 422, 423, and 424 depicted by dotted lines, each including fewer road segments than the high level clusters 411, 412, and 413. As an example, the low level cluster 421 includes the road segment 401 and the low level cluster 422 includes two road segments 402 and 403. In this connection, the high level cluster 411 may include two low level clusters 421 and 422. However, high level clusters and low level clusters may overlap with each other.

The clusters of road segments at different levels may provide substantial flexibility in the request consolidation. For example, the server 212 may consolidate the requests based on different levels of clusters depending on many factors, for example, the status of the road network 202 and/or the server cluster 214. The status of the road network 202 may be represented by traffic status and/or the amount of requests. For example, a lower level of clusters may be preferable when the road segments are occupied with more vehicles. In this way, there are still a great number of concurrent request to be consolidated even if a lower level of clusters have been used. On the other hand, when the concurrent requests are too many for the server cluster 214 to process, a higher level of clusters may be employed, thereby consolidating requests from more road segments.

A variety of clustering algorithms, either currently known or to be developed in future, can be used to divide or categorize the road segments at different levels. For example, different threshold numbers of road segments in a cluster may be predetermined for different levels. Alternatively, given a road network, the number of clusters to be generated may be varied so as to obtain dusters with different levels.

After the clustering process is completed, some attributes for the clusters may also be determined to facilitate online processing of requests for access to dynamic map. For example, a characteristic distance may be determined for each cluster of road segments. To this end, the largest route length starting or terminating at one road segment inside the duster may be determined for the road segment. Then, the largest one of all the route lengths for the cluster may be determined as the characteristic distance. As used herein, the term "route" refers to a way or course taken in getting from a starting point to a destination and thus the term "route length" refers to the length of the way or course.

For example, in the cluster 411, the largest route length starting or terminating at the road segment 401 or 402 may be the length of the road segment 403, and the largest route length starting or terminating at the road segment 403 may be the length of the road segment 402. In this way, the characteristic length of the cluster may be determined as the length of the road segment 403. Alternatively, the characteristic distance for a cluster may be simply defined as the largest route length in the cluster. For example, the characteristic distance for the cluster 422 may be the total length of road segments 402 and 403.

Figure 5:
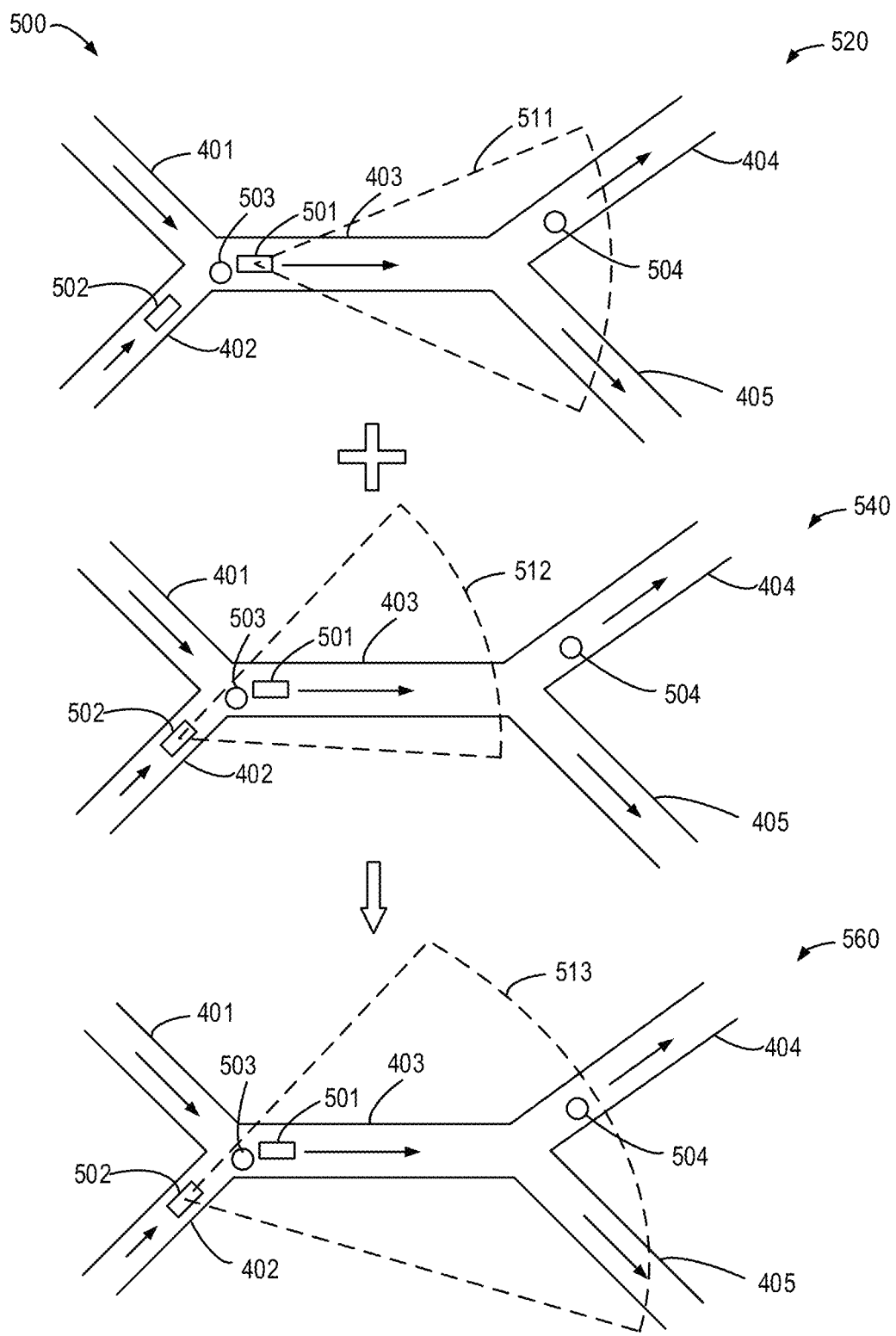
FIG. 5 depicts a schematic diagram illustrating a process 500 for consolidating requests for access to dynamic map in accordance with an embodiment of the present invention.

Still in reference to FIG. 3, in step 306, the server 212 may consolidate the requests from the multiple vehicles if the multiple requests are determined to be in the same cluster of road segments in the road network 202 in step 304. FIG. 5 shows a schematic diagram of a consolidation process 500 which can be considered as an example implementation of step 306. In this example, a first vehicle 501 and a second vehicle 502 are shown as rectangular boxes on road segments 403 and 402, respectively. Two spots in question are also shown, including spots 503 and 504 shown as circles. The spots may indicate, for example, flooding/slippery locations. The first region enclosed by dashed line 511 may be the region specified by the request from the first vehicle 501 and may be also referred to as region 511, while the second region enclosed by dashed line 512 may be the region specified by the request from the second vehicle 502 and may also be referred to as region 512. The requests from the two vehicles 501 and 502 may specify a same distance, for example, in the driving directions denoted by the arrows. The requests may also specify two different distances in alternative embodiments.

If the two road segments 402 and 403 are determined to be in the same cluster of road segments, for example, cluster of road segments 411 or 422 shown in FIG. 4, the two requests may be consolidated to generate a consolidated request. The consolidated request may specify a consolidated query region based on the road segments where the vehicles are located and the query regions specified by the vehicles. In some embodiments, the consolidated query region may include all the query regions specified by requests from all the vehicles in the same cluster. The consolidated query region may include a consolidated road segment and a consolidated road distance, for example.

In particular, as shown in portion 560, the region 513 represents a region specified by the consolidated request. The region 513 may start from the upstream one of the two vehicles, and may extend as far as the consolidated road distance. The consolidated road distance may be determined in various ways. As described above, the clustering method 204 may have determined a characteristic road distance for each cluster of road segments. In this connection, the consolidated distance may be determined based on the characteristic road distance for the cluster and the distances specified in the initial requests. For example, the consolidated road distance for vehicles 501 and 502 may be the characteristic distance of cluster 411 or 422 in addition with the road distance specified by requests from the two vehicles, if the two requests specify the same distance. The vehicles 501 and 502 are in clusters 411 and 422 at different levels, and the characteristic distance may be used depending on which cluster of road segments has been used.

It is to be understood that although only two vehicles 501 and 502 are illustrated, there may be thousands of concurrent requests from a single cluster of road segments, which may vary from cluster to cluster and/or from among different levels of clusters of road segments. With increase of the amount of concurrent requests, the advantageous effect of the consolidation process 500 may be significantly enhanced.

Still in reference to FIG. 3, the requests may be consolidated to a consolidated request, which in turn is sent to the server cluster 214 hosting the dynamic map to retrieve dynamic context information. In some embodiments, after retrieving the requested dynamic context information, the server 212 may further process the retrieved information in conformity with original requests. For example, the server 212 may modify the retrieved dynamic context information for each of the requests from the vehicles. To this end, the server 212 may remove dynamic context information inconsistent with the initial requests. This operation will be described in detail with reference to FIGS. 6a-b.

Figure 6A:
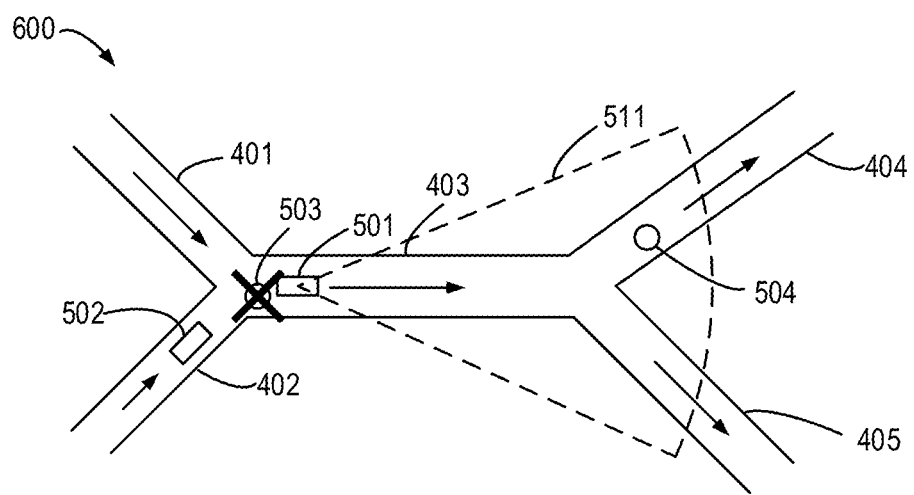
FIG. 6a-b depict schematic diagrams illustrating a process of removing context information inconsistent with initial requests in accordance with an embodiment of the present invention.
Figure 6B:
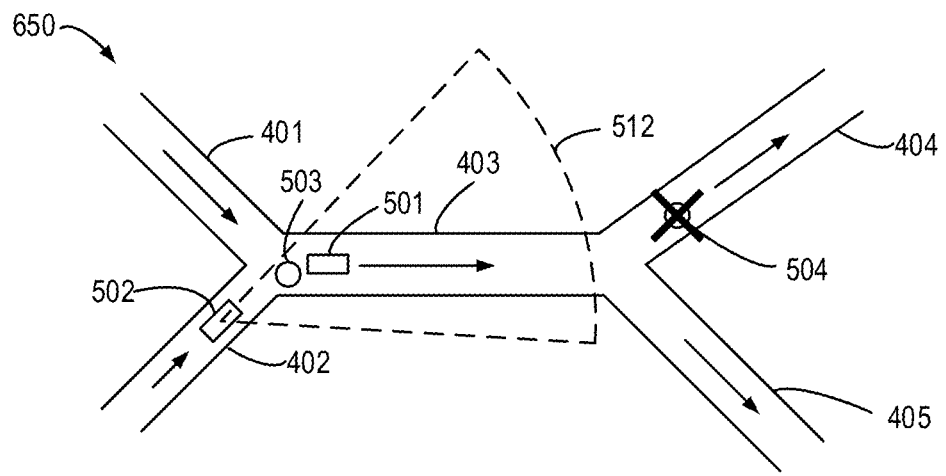

As shown in FIG. 6a, the spot 503 is out of the range of request for vehicle 501. As a result, the context information with regard to the spot 503 may be removed from the retrieved context information. Then, the information associated with the spot 504 may be sent to the corresponding vehicle 501. As another example, the spot 504 is out of the range of request for vehicle 502, as shown in FIG. 6b. As a result, the context information with regard to the spot 504 may be removed from the retrieved context information. Then, the information associated with the spot 503 may be sent to the corresponding vehicle 502.

Exemplary Aspects, Using a Cloud-Computing Environment

Although this detailed description includes an exemplary embodiment of the present invention in a cloud-computing environment, it is to be understood that implementation of the teachings recited herein are not limited to such a cloud-computing environment. Rather, embodiments of the present invention are capable of being implemented in conjunction with any other type of computing environment now known or later developed.

Cloud-computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud-computing is an infrastructure comprising a network of interconnected nodes.

Referring now to FIG. 1, a schematic of an example of a cloud-computing node is shown. Cloud-computing node 10 is only one example of a suitable node and is not intended to suggest any limitation as to the scope of use or functionality of embodiments of the invention described herein. Regardless, cloud-computing node 10 is capable of being implemented and/or performing any of the functionality set forth herein.

Although cloud-computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud-computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud-computing environments where tasks are performed by remote processing circuits that are linked through a communications network. In a distributed cloud-computing environment, program modules may be located in both local and remote computer system storage media including memory storage circuits.

Referring again to FIG. 1, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only; storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 7:
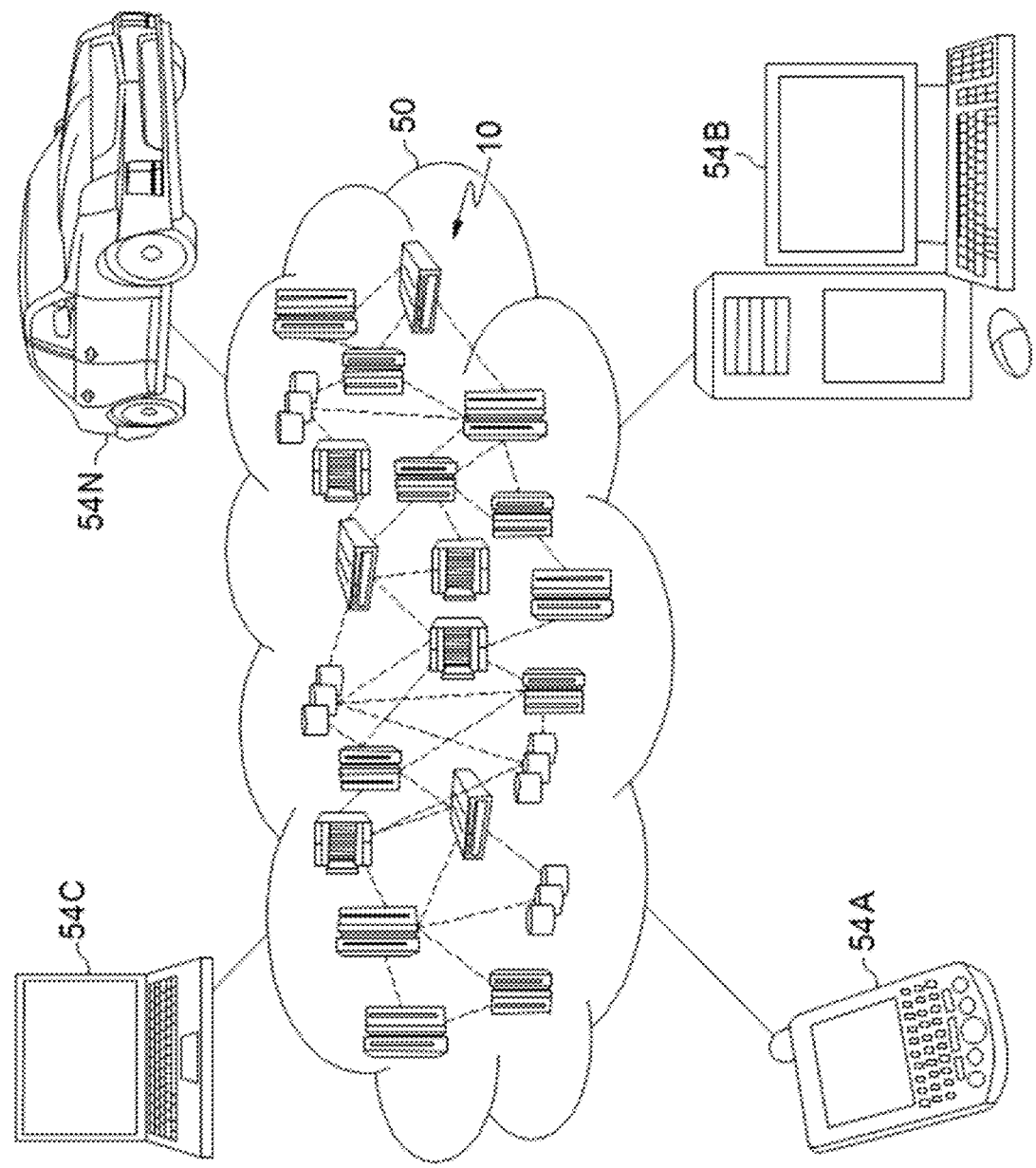
FIG. 7 depicts a cloud computing environment 50 according to an embodiment of the present invention.

Referring now to FIG. 7, illustrative cloud-computing environment 50 is depicted. As shown, cloud-computing environment 50 comprises one or more cloud-computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud-computing environment 50 to offer infrastructure, platforms and/or software as services for which a cloud consumer does not need to maintain resources on a local computing circuit. It is understood that the types of computing circuits 54A-N shown in FIG. 7 are intended to be illustrative only and that computing nodes 10 and cloud-computing environment 50 can communicate with any type of computerized circuit over any type of network and/or network addressable connection e.g., using a web browser).

Figure 8:
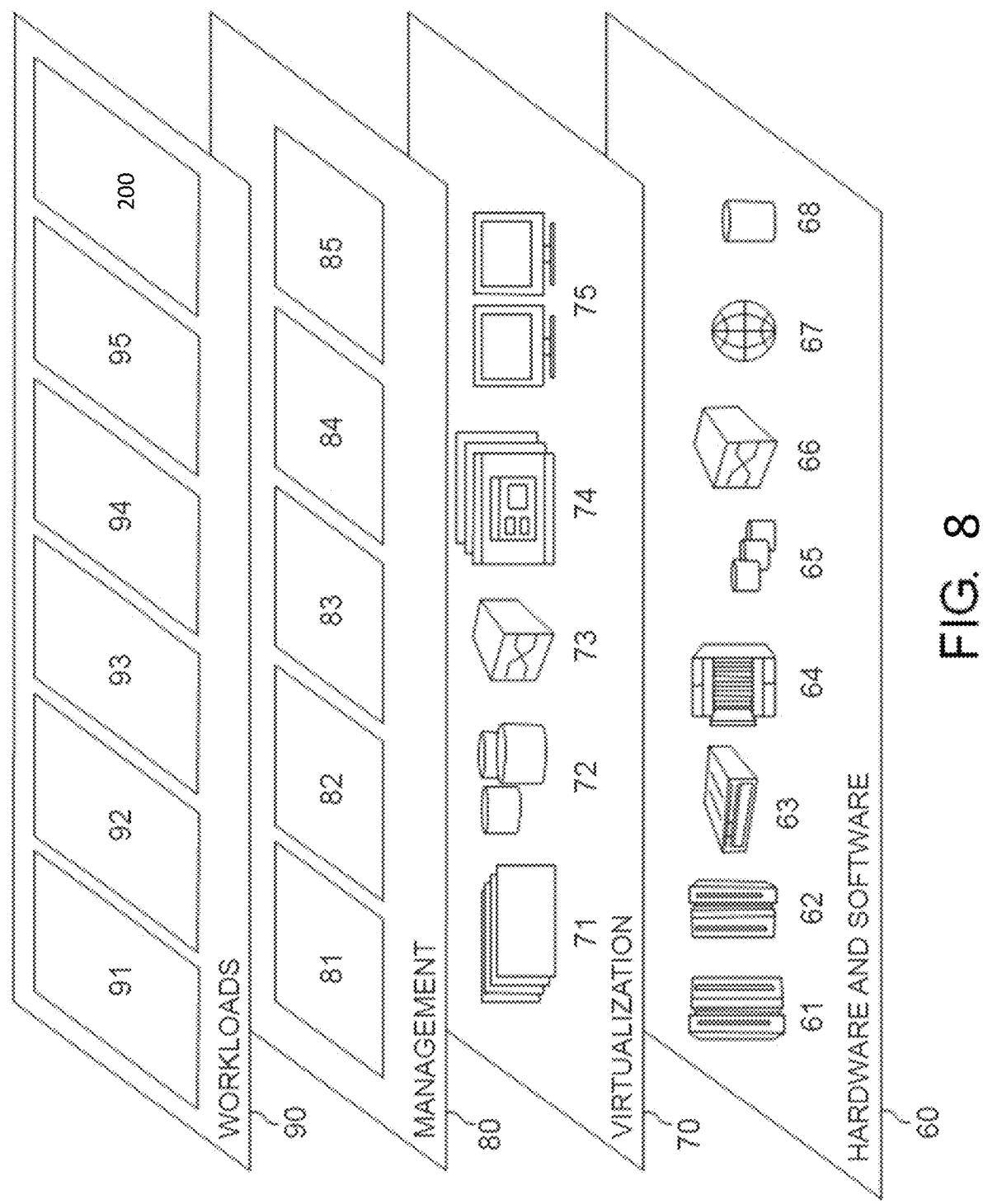
FIG. 8 depicts abstraction model layers according to an embodiment of the present invention.

Referring now to FIG. 8, an exemplary set of functional abstraction layers provided by cloud-computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud-computing environment. Metering and Pricing 82 provide cost tracking as resources are utilized within the cloud-computing environment, and billing or invoicing for consumption of these resources. In one example, these resources may comprise application software licenses. Security provides identity verification for cloud consumers and tasks, as well as protection for data and other resources. User portal 83 provides access to the cloud-computing environment for consumers and system administrators. Service level management 84 provides cloud-computing resource allocation and management such that required service levels are met. Service Level Agreement (SLA) planning and fulfillment 85 provide pre-arrangement for, and procurement of, cloud-computing resources for which a future requirement is anticipated in accordance with an SLA.

Workloads layer 90 provides examples of functionality for which the cloud-computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the consolidating method 300.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the factions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented method, the method comprising:
    consolidating, at a network server, via clustering, a plurality of requests for dynamic context information from a plurality of road segments to generate a consolidated request as a result of the plurality of requests being requested from a same cluster of road segments in a road network; and
    retrieving the dynamic context information,
    wherein the plurality of requests are requested by at least two different vehicles, and
    wherein context information is removed based on a range of the at least two different vehicles.

2. The computer-implemented method of claim 1, wherein the plurality of road segments are determined to be included in a first cluster at a first level and a second cluster at a second level, and
    wherein the consolidating the plurality of requests comprises:
    determining the cluster from the first and second clusters based on a status of the road network or a server hosting the dynamic context information.

3. The computer-implemented method of claim 1, wherein the plurality of requests specify a plurality of road distances, and
    wherein the consolidating the plurality of requests to generate the consolidated request comprises:
    determining a consolidated road segment and a consolidated road distance based on the plurality of road segments and the plurality of road distances; and
    generating the consolidated request based on the consolidated road segment and the consolidated road distance.

4. The computer-implemented method of claim 3, further comprising determining the consolidated road distance by determining the consolidated road distance based on the plurality of road distances and characteristic road distances for the cluster.

5. The computer-implemented method of claim 1, further comprising:
modifying the retrieved dynamic context information for the plurality of requests by removing dynamic context information inconsistent with the plurality of requests.

6. The computer-implemented method of claim 1, wherein the cluster is generated by clustering the road segments in the road network based on similarity of sets of road segments within one or more road distances from the plurality of road segments to be clustered.

7. The computer-implemented method of claim 1, embodied in a cloud-computing environment.

8. A system, comprising:
a processor; and
a memory, the memory storing instructions to cause the processor to perform:
consolidating, at a network server, via clustering, a plurality of requests for dynamic context information from a plurality of road segments to generate a consolidated request as a result of the plurality of requests being requested from a same cluster of road segments in a road network; and
retrieving the dynamic context information,
wherein the plurality of requests are requested by at least two different vehicles, and
wherein context information is removed based on a range of the at least two different vehicles.

9. The system of claim 8, wherein the plurality of road segments are determined to be included in a first cluster at a first level and a second cluster at a second level, and
wherein the consolidating the plurality of requests comprises:
determining the cluster from the first and second clusters based on a status of the road network or a server hosting the dynamic context information.

10. The system of claim 8, wherein the plurality of requests specify a plurality of road distances, and
wherein the consolidating the plurality of requests to generate the consolidated request comprises:
determining a consolidated road segment and a consolidated road distance based on the plurality of road segments and the plurality of road distances; and
generating the consolidated request based on the consolidated road segment and the consolidated road distance.

11. The system of claim 10, further comprising determining the consolidated road distance by determining the consolidated road distance based on the plurality of road distances and characteristic road distances for the cluster.

12. The system of claim 8, wherein the memory further stores instructions to cause the processor to perform:
modifying the retrieved dynamic context information for the plurality of requests by removing dynamic context information inconsistent with the plurality of requests.

13. The system of claim 8, embodied in a cloud-computing environment.

14. The system of claim 13, wherein the cluster is generated by clustering the road segments in the road network based on similarity of sets of road segments within one or more road distances from the plurality of road segments to be clustered.

15. A computer program product, the computer program product comprising a computer-readable storage medium having program instructions embodied therewith, the program instructions executable by a computer to cause the computer to perform:
consolidating, at a network server, via clustering, a plurality of requests for dynamic context information from a plurality of road segments to generate a consolidated request as a result of the plurality of requests being requested from a same cluster of road segments in a road network; and
retrieving the dynamic context information,
wherein the plurality of requests are requested by at least two different vehicles, and
wherein context information is removed based on a range of the at least two different vehicles.

16. The computer program product of claim 15, wherein the plurality of road segments are determined to be included in a first cluster at a first level and a second cluster at a second level, and
wherein the consolidating the plurality of requests comprises:
determining the cluster from the first and second clusters based on a status of the road network or a server hosting the dynamic context information.

17. The computer program product of claim 15, wherein the plurality of requests specify a plurality of road distances, and wherein the instructions, when executed on the computer, cause the computer to perform:
determining a consolidated road segment and a consolidated road distance based on the plurality of road segments and the plurality of road distances; and
generating the consolidated request based on the consolidated road segment and the consolidated road distance.

* * * * *